United States Patent [19]

Tsals et al.

[11] Patent Number: 4,796,463
[45] Date of Patent: Jan. 10, 1989

[54] VARIABLE PERMEABILITY STEERING TORQUE SENSOR

[75] Inventors: Izrail Tsals, Princeton Junction; Ilya Feygin, Westfield; William Marder, Pennington, all of N.J.

[73] Assignee: General Motors Corporation, Detroit, Mich.

[21] Appl. No.: 34,535

[22] Filed: Apr. 6, 1987

[51] Int. Cl.⁴ .................................................. G01L 3/10
[52] U.S. Cl. .................................................... 73/862.33
[58] Field of Search ................. 73/862.33; 336/30, 134

[56] References Cited

U.S. PATENT DOCUMENTS 2,826,064  3/1958  Hastings ............................ 73/862.33
4,616,512 10/1986  Himmelstein et al. ........... 73/862.36

Primary Examiner—Charles A. Ruehl
Attorney, Agent, or Firm—Mark A. Navarre

[57] ABSTRACT

An electromagnetic torque sensor arrangement comprising a pair of magnetic circuits differentially responsive to the twist of a rotary shaft under load. Each magnetic circuit comprises a stator assembly, and at least one deflectable element disposed therein on a pair of pins which experience relative rotation in relation to the twist of the shaft. The relative rotation causes deflection of the deflectable elements in relation to the twist, and the resulting variation in the permeability of the magnetic circuits is detected as a measure of the applied torque.

5 Claims, 5 Drawing Sheets

VARIABLE PERMEABILITY STEERING TORQUE SENSOR

This invention relates to measuring the torque transmitted through a rotary shaft and more particularly to an electromagnetic sensor responsive to deformation of the shaft under load.

It is well-known in the torque sensing art that deformation or twist of a rotary shaft under load can be sensed as a measure of the torque being transmitted through the shaft. In relatively low torque applications where the amount of twist may be too small for accurate measurement, such as in automotive power steering systems, the twist is typically augmented by inserting a torsion bar between two relatively rigid sections of the shaft. The relative rotation of the rigid sections may be detected using a variety of electrical or mechanical sensing arrangements. This invention pertains to an electrical sensing arrangement.

Preferably, the sensing arrangement should have a stationary transducer element, thereby avoiding the need for slip rings or other rotating or sliding contact arrangements. In addition, the sensing arrangement should be insensitive to axial loading of the shaft, a particularly important requirement in automotive steering applications.

This invention is directed to an improved sensor for detecting the torque applied to an automotive steering shaft, where the transducer element of the sensor is stationary relative to the steering shaft, and the sensor output is substantially insensitive to axial loading of the shaft. The sensor operates on the principle of variable permeability. In the illustrated embodiment, it comprises a pair of magnetic circuits differentially responsive to the twist of the rotary shaft under load. Each magnetic circuit comprises a stator assembly, and at least one deflectable element disposed therein on a pair of pins which experience relative rotation in relation to the twist of the shaft. The relative rotation causes deflection of the deflectable elements in relation to the twist, and the resulting variation in the permeability of the magnetic circuits is detected as a measure of the applied torque.

The length of the deflectable elements is such that the elements conform in profile to the inner periphery of the respective stator assembly defining a relatively small air gap therebetween. The pins emanate from one or the other of a pair of support discs secured to longitudinally displaced points on the shaft, such that the end points of each deflectable element are supported by pins emanating from different support discs.

Relative rotation of the support discs, due to deformation or twist of the rotary shaft, produces relative rotation of the pins and deflection of the deflectable elements. The amount of deflection and the consequent change in the air gap between the stator assembly and the deflectable element of a respective magnetic circuit is proportional to the polarity and magnitude of torque transmitted through the shaft.

The stator assemblies each comprise an annular magnetic core having a radial recess formed on the inner periphery thereof, and primary and secondary electrically isolated windings disposed therein. The primary windings of the core assemblies are connected in series and excited with alternating current to develop magnetic flux in each core assembly in a magnetic path comprising the respective core, air gap and deflectable element. The average dimension of the air gap between a given core and deflectable element, alters the magnetic coupling between the respective primary and secondary windings, and hence, the magnitude of the voltage induced in the secondary winding.

The pins and deflectable elements are so arranged that the deflectable elements of the two magnetic circuits deflect oppositely when the shaft is twisted. That is, transmission of torque through the shaft causes the air gap of one of the magnetic circuits to decrease, while the air gap of the other magnetic circuit increases. The secondary winding voltages are thus differentially induced. The secondary windings are connected in series and synchronously demodulated to yield an output signal which varies in proportion to the torque. The angular position of the support discs is calibrated at the time of assembly, such that a null output voltage is achieved when no torque is applied to the shaft.

In the preferred embodiment, a pair of deflectable elements is disposed within each magnetic circuit, each such element being similarly deflected in response to the transmission of torque through the shaft. In addition, a torsion bar is inserted between relatively rigid sections of the shaft between the longitudinally displaced support discs, and the allowable twist of the torsion bar is limited by a lost motion coupling connected between the rigid shaft sections.

IN THE DRAWINGS

Figure 3:
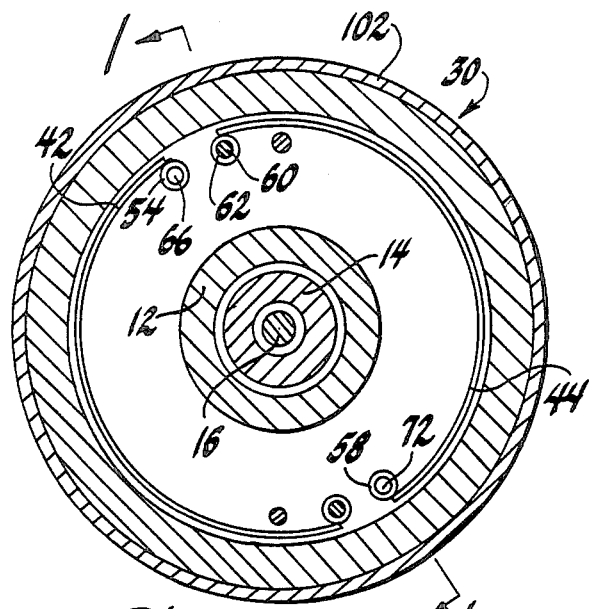
Figure 4:
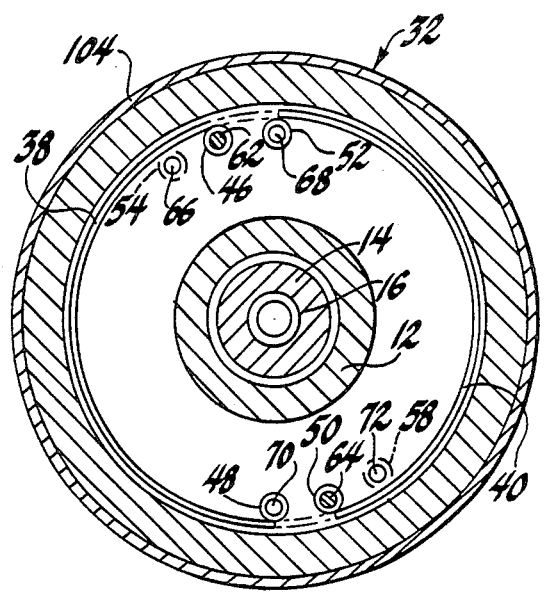
Figure 5:
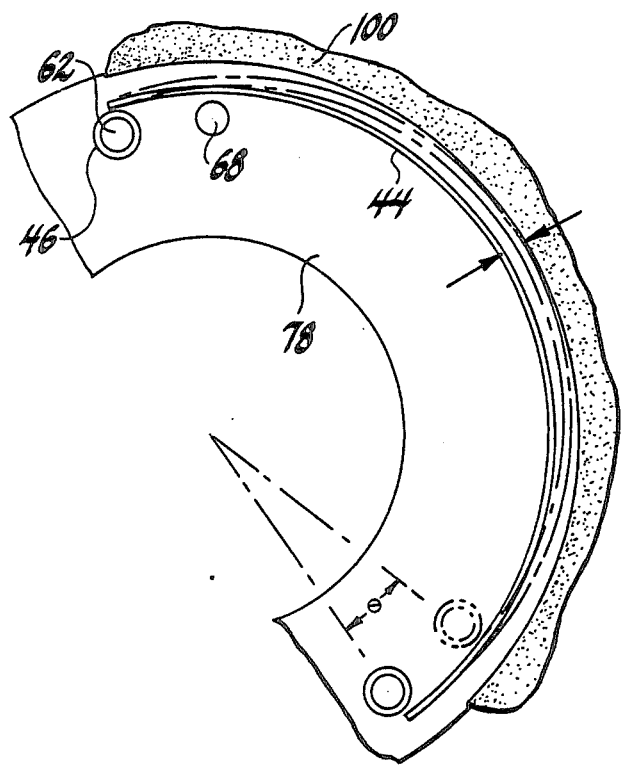

FIGS. 3 and 4 are further sections taken along the lines 3—3 and 4—4, respectively. FIG. 5 is a partial section illustrating the operation of a deflectable sensor element.

Figure 6:
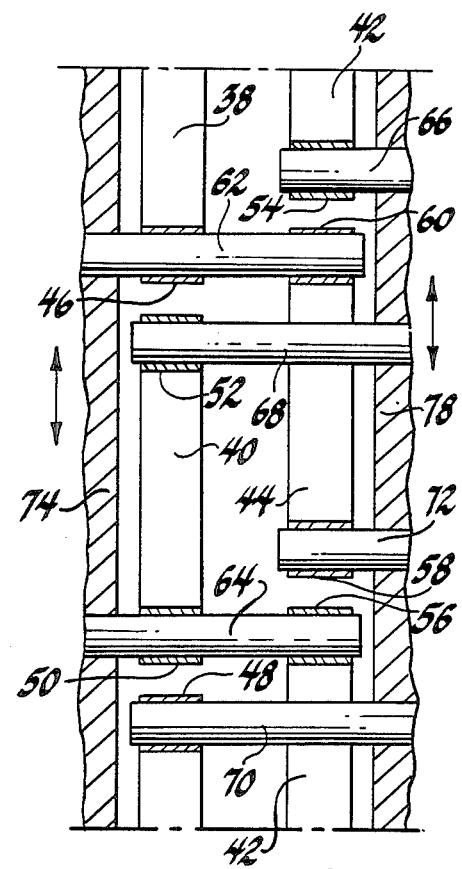

FIG. 6 is a linearized representation of the pins and deflectable elements of the torque sensor of this invention.

Figure 7:
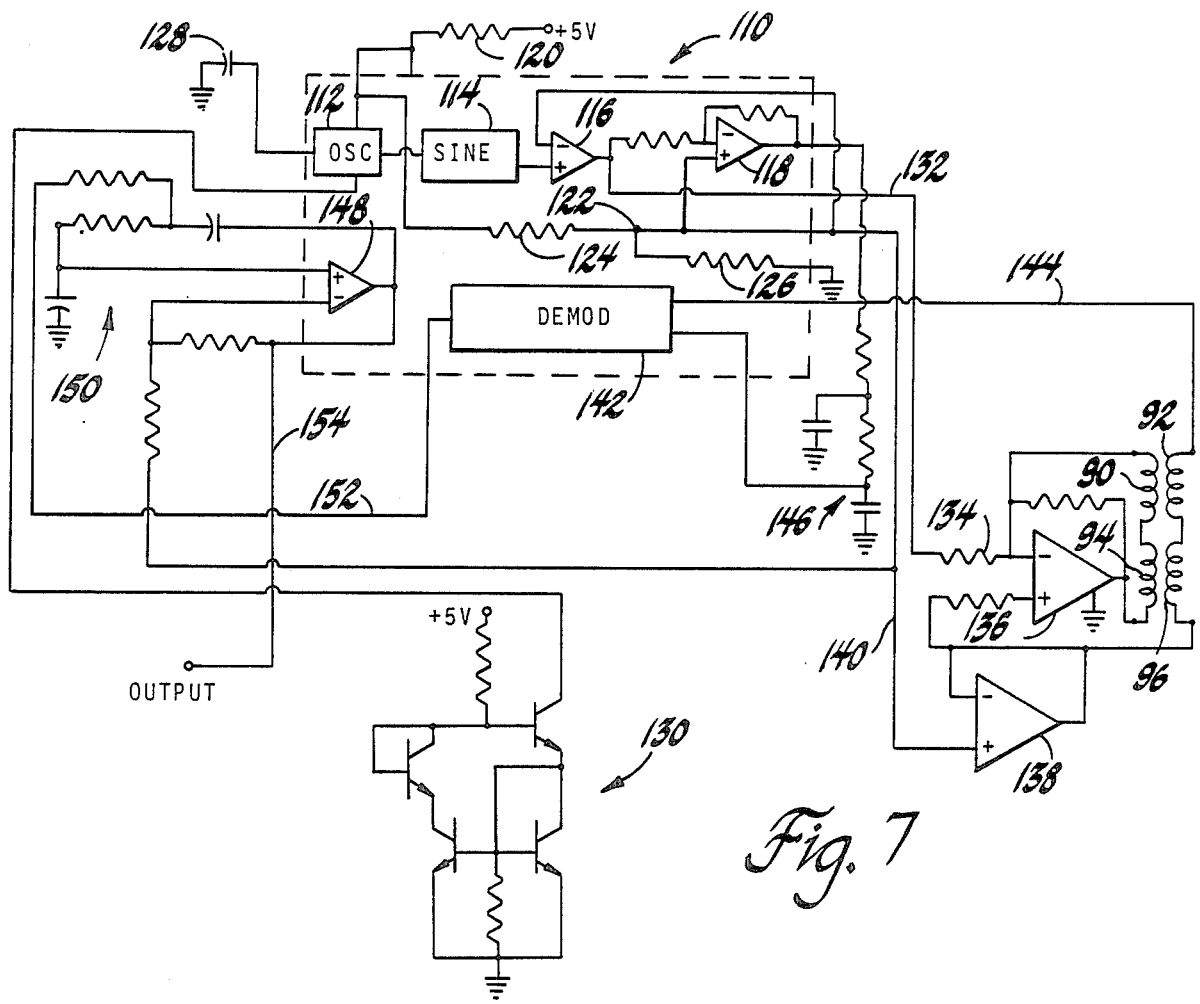

FIG. 7 is an electrical circuit diagram depicting the primary and secondary winding connections and a control circuit for producing a DC output voltage in accordance with the relative rotation of the support discs depicted in FIGS. 1–6.

Figure 8:
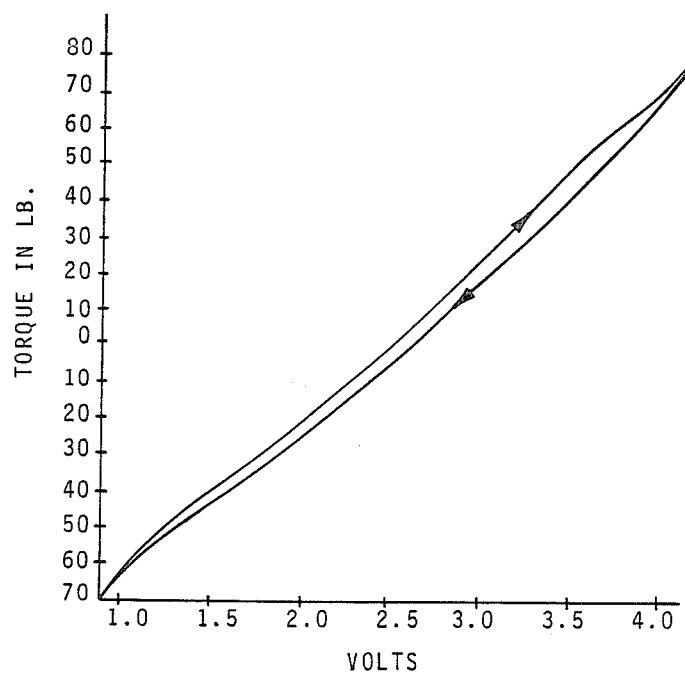

FIG. 8 is a graph depicting the output voltage of the control circuit depicted in FIG. 7 as a function of the torque transmitted through the rotary shaft.

Figure 9:
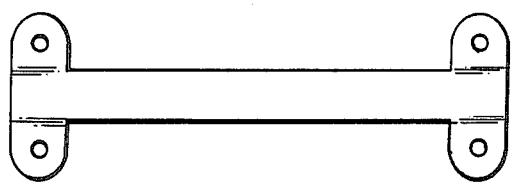
Figure 10:
Figure 11:
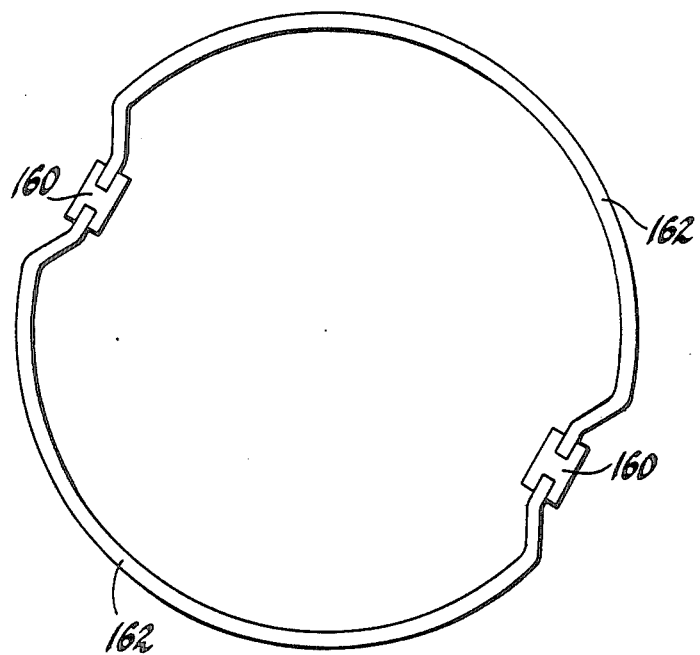

FIGS. 9–11 depict alternate configurations for the deflectable elements of the torque sensor of this invention.

Figure 1:
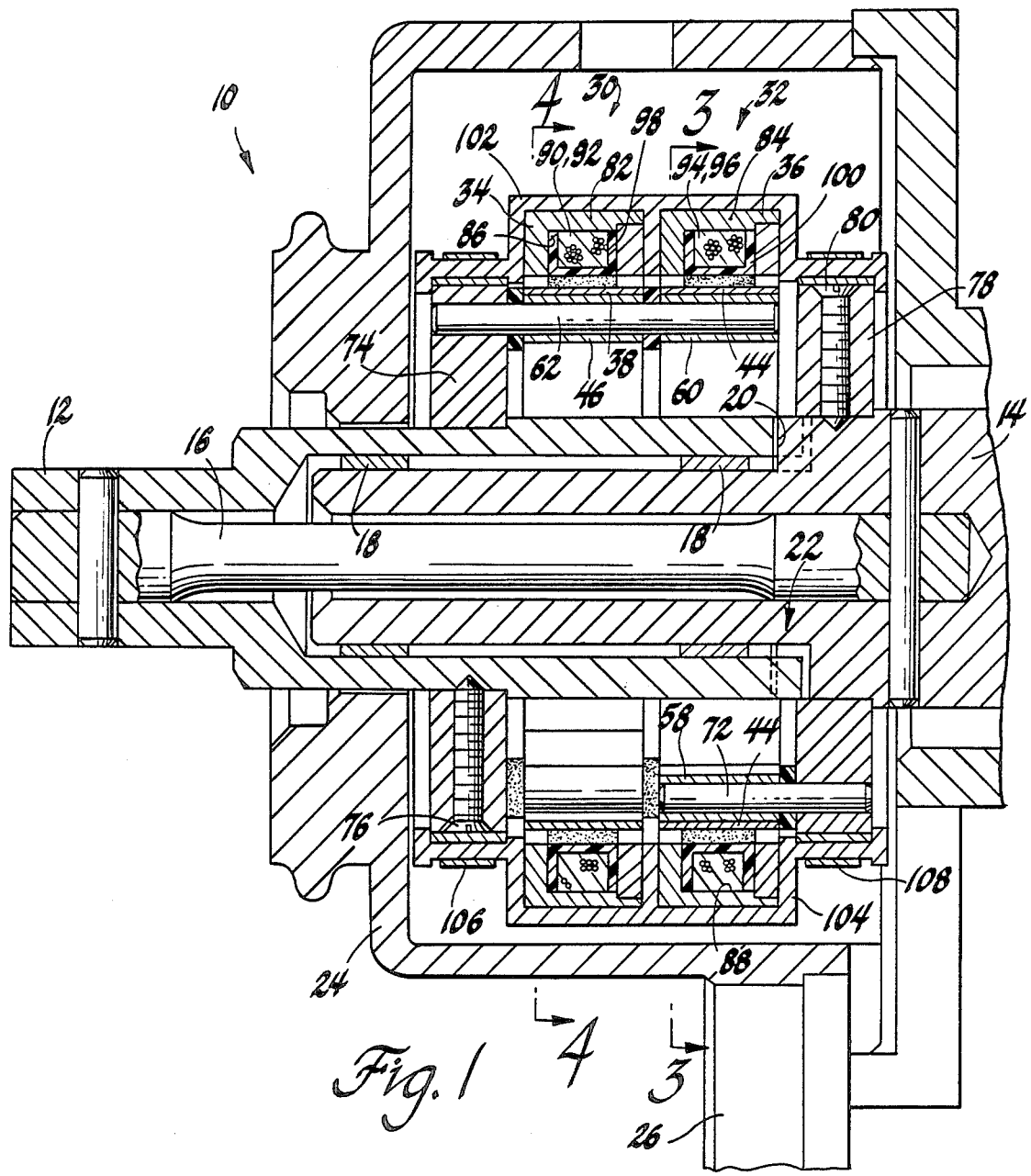
FIG. 1 is a cross-sectional view of the torque sensor of this invention as applied to the handwheel shaft of an automotive steering system.

Referring now to the drawings, and more particularly to FIG. 1, the reference numeral 10 generally designates the variable permeability torque sensor of this invention. The sensor 10 is depicted in connection with a power-assisted automotive steering system of the type depicted in the U.S. Pat. No. 4,509,611 to Kade et al., issued Apr. 19, 1985, and assigned to the assignee of the present invention. In such context, the torque sensor 10 provides an indication of the driver-exerted steering torque. A power-assist mechanism, which may include an electric motor, is energized in relation to the indicated torque to generate steering assist torque which aids the driver-exerted torque.

Driver-exerted torque is applied to the input shaft 12 through a conventional handwheel (not shown). The driver-exerted torque is transmitted to output shaft 14 via torsion bar 16. The torsion bar 16 is pinned to the input and output shafts 12 and 14, as shown. The output shaft 14 is supported within a recess of input shaft 12 on the bearings 18. The outboard end of the input shaft 12 and the boss 20 of output shaft 14 are toothed, as designated generally by the reference numeral 22, to form a lost motion coupling which limits the twist of torsion bar 16 to plus or minus two degrees. Within the plus or minus two degrees of twist, the torsion bar 16 transmits the torque between input and output shafts 12 and 14. Torque in excess of that required to produce the plus or minus two degrees of twist is transmitted via the coupling 22.

A pinion gear (not shown) formed on the outboard end of output shaft 14 is adapted to drivingly engage the toothed rack of a rack and pinion steering mechanism. In addition, a power-assist gear (not shown) may also be formed on the output shaft 14 for receiving steering assist torque from a rotary mechanism, such as an electric motor.

The various elements of sensor 10 are disposed within a housing member 24. A bracket 26 integral with the housing 24 is adapted to be mounted on a stationary support member of the steering system thereby providing a stationary support for the housing 24.

Figure 2:
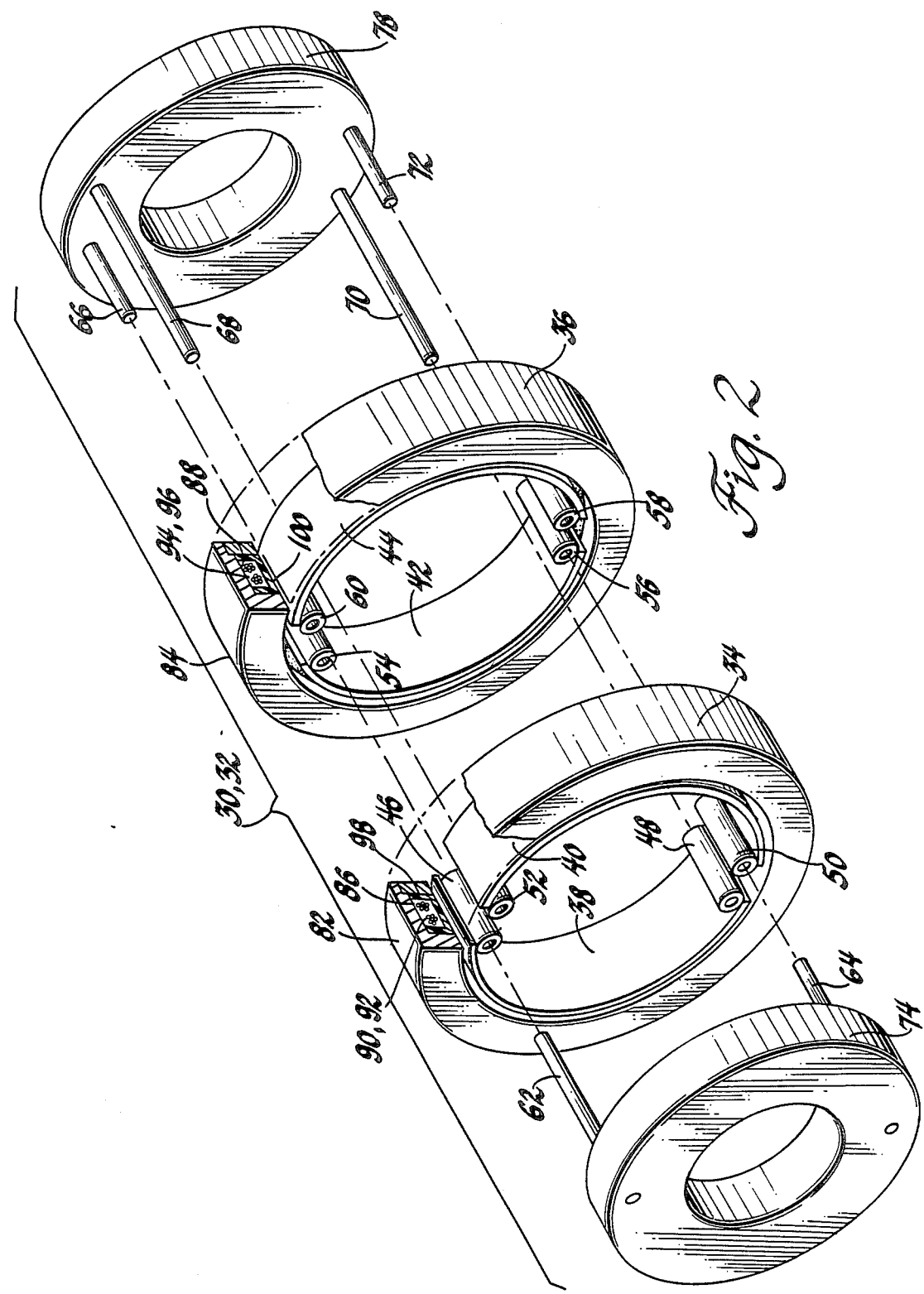
FIG. 2 is an exploded view of the support discs and magnetic circuits of the torque sensor of this invention.

As best seen in FIGS. 1 and 2, the sensor 10 comprises a pair of magnetic circuits, generally designated by the reference numerals 30 and 32, each such circuit comprising an annular stator assembly 34, 36 and a pair of deflectable elements 38, 40; 42, 44 disposed therein. The stator assemblies 34 and 36 are prevented from rotating with respect to the housing member 24 by a suitable mounting arrangement (not shown). Each deflectable element 38–44 has a pair of support tubes 46–60 welded to its inner periphery for supporting it within the respective stator assembly 34 or 36. The support tubes 46–60 are disposed on a plurality of pins 62–72 extending parallel to the input and output shafts 12 and 14 within the stator assemblies 34 and 36. The pins 62 and 64 emanate from an input support disc 74 secured to the input shaft 12 for rotation therewith via the threaded fasteners 76, and the pins 66–72 emanate from an output support disc 78 secured to the output shaft 14 for rotation therewith via the threaded fasteners 80. Alternately, the support disks 74 and 78 could be press-fit on the shafts 12 and 14.

The location of the pins 62–72 and the length of the deflectable elements 38–44, is such that the elements 38–44 conform to the inner periphery of the stator assemblies 34 and 36, defining relatively small air gaps therebetween. Any given deflectable element 38–44 is supported at one end by a pin 62 or emanating from the input support disc 74 and at its other end by a pin 66, 68, 70 or 72 emanating from the output support disc 78.

Due to the action of torsion bar 16, torque applied to the input shaft 12 results in rotation of the pins 62–64 relative to the pins 66–72, and deflection of the deflectable elements 38–44. The amount of deflection and the consequent change in the air gap between the deflectable elements 38–44 and the inner peripheries of the respective stator assemblies 34–36, is proportional to the direction and magnitude of torque applied to the input shaft 12.

The pins 62–72 and deflectable elements 38 44 are arranged so that the deflectable elements 38 and 40 deflect in opposition to the deflectable elements 42 and 44 in response to the application of torque to input shaft 12. As a result, the secondary winding voltages are differentially induced. By way of example, application of clockwise torque to the input shaft 12 produces radially outward deflection of the deflectable elements 38 and 40, and radially inward deflection of the deflectable elements 42 and 44. Similarly, the application of counterclockwise torque to the input shaft 12 produces radially inward deflection of the deflectable elements 38 and 40 and radially outward deflection of the deflectable elements 42 and 44.

The stator assemblies 34 and 36 each include an annular magnetic core 82, 84 comprising two press-fit annular elements as shown to define a radial recess 86, 88 on the inner periphery thereof, and a pair of electrically isolated windings 90, 92; 94, 96 disposed within a bobbin 98, 100 within the respective recess 86, 88. Plastic shell halves 102, 104 are positioned around the assembly and clamped in place by the bands 106, 108 to retain the various components of the assembly.

As indicated in the circuit diagram of FIG. 7, the primary windings 90, 94 of the magnetic circuits 30 and 32, are connected in series. They are excited with alternating current to develop magnetic flux in the magnetic circuits 30 and 32. In each such magnetic circuit, the flux traverses a path comprising the annular core 82, the respective deflectable elements 38, 40; 42, 44, and the air gap therebetween. The average dimension of the air gap between a given core 82, 84 and its respective deflectable elements 38, 40; 42, 44, determines the magnetic coupling between the respective primary and secondary windings, and hence, the magnitude of the voltage induced in the secondary windings 92 and 96.

The secondary windings 92 and 96 are connected in series as shown. Since the secondary voltages are differentially induced, as described above, the circuit electrically resembles a linear variable differential transformer (LVDT) arrangement. The net signal induced in the secondary windings 92, 96 is synchronously demodulated to yield an output signal which varies in proportion to variations in the magnetic permeability of the magnetic circuits 30 and 32. Due to the operation of the torsion bar 16, the input and output support discs 74 and 78, and the deflectable members 38–44, such output signal is also directly proportional to the twist of the torsion bar 16 and hence the torque applied to the input shaft 12.

Referring now more specifically to the circuit diagram of FIG. 7, the reference numeral 110 generally designates a circuit including a source for exciting the primary windings 90 and 94, and a synchronous demodulator for demodulating an output signal from the secondary windings 92 and 96. The source and demodulator elements are packaged together in a single integrated circuit, such as the SE 5521 LVDT Signal Conditioner, manufactured and sold by Signetics Corporation.

The source portion of circuit 110 comprises a triangle wave oscillator (OSC) 112, a sine converter (SINE) 114 for converting the triangle wave output to a low distortion sine wave, and a pair of operational amplifiers 116 and 118 which buffer the sine wave. A regulated 5-volt potential is applied to the circuit 110 via resistor 120, and a reference voltage is derived therefrom at junction 122 by the resistors 124 and 126. Among other things, the reference voltage is used as an offset for the operational amplifiers 116 and 118. The oscillator frequency is determined by the capacitor 128, and a current mirror circuit 130 ensures constant current excitation of the primary windings 90, 94 regardless of supply voltage variations.

The buffered sine wave output of circuit 110 on line 132 is applied as an input via resistor 134 to the operational amplifier driver 136 for exciting the primary windings 90, 94 with constant current. The operational amplifier 138 is connected to the junction 122 of circuit 110 via line 140, and provides a reference offset for both the operational amplifier 136 and the secondary windings 92, 96.

The synchronous demodulator (DEMOD) 142 of circuit 110 is connected to the secondary windings 92, 96 via line 142, and full-wave rectifies the induced secondary voltage in synchronism with the oscillator frequency. An oscillator sync signal is taken from the output of operational amplifier 118, filtered by the RC network 146. The auxiliary amplifier 148, in conjunction with the RC elements generally designated by the reference numeral 150 comprises an active filter for removing the oscillator carrier frequency from the synchronous demodulator output signal on line 152. A ripple-free DC output signal as generally depicted in the graph of FIG. 8 thereby appears on output line 154.

As indicated in the graph of FIG. 8, the output signal on line 154 is centered at the offset voltage (2.5 volts) of junction 122, and varies linearly therefrom with the magnitude and direction of the torque applied to steering input shaft 12. This is achieved, as indicated above, by calibrating the angular position of the support discs 74, 78 at the time of assembly such that a null output voltage is indicated on line 154 when no torque is applied to the input shaft 12. A small amount of hysteresis may be present, as indicated.

FIGS. 9-11 depict two alternate embodiments of the deflectable elements 38-44. The embodiment depicted in FIGS. 9-10 is formed from flat sheet metal, cut and creased as shown in FIG. 9, and then folded for application to the pins 62-72, as shown in FIG. 10. The embodiment depicted in FIG. 11 requires the use of clips, such as designated by the reference numerals 160, in place of the pins 62-72 depicted in FIGS. 1-6. In such embodiment, the deflectable elements (designated by the reference numerals 162) are preformed and inserted into the respective clips 160.

This invention has been described in reference to the illustrated embodiments which incorporate a pair of differentially responsive magnetic circuits. However, it should be understood that only one magnetic circuit is required to obtain a torque indication. Providing two differentially responsive magnetic circuits as shown herein results in a measuring redundancy, a desirable feature in control applications where the torque measurement may be critical to proper system performance.

Various other modifications will also occur to those skilled in the art. For example, a different circuit arrangement may be used to excite the primary windings 90, 94 and to demodulate the voltage induced in the secondary windings 92, 96. In this regard, it will be understood that sensors incorporating these and other modifications may fall within the scope of this invention, which is defined by the appended claims.

The embodiments of the invention in which an exclusive property or privilege is claimed are defined as follows:

1. A sensor responsive to the deformation of a rotary shaft to provide an indication of the torque which produced the deformation, the sensor comprising:
annular magnetic core means disposed about said shaft and supported stationary with respect thereto, primary and secondary windings disposed within a recess in the inner periphery of said core means, and magnetic deflectable means disposed within said core means to define an air gap between said deflectable means and said core means, the deflectable means being supported at longtitudinally displaced points thereof by a pair of support means which experience relative rotation in relation to the deformation of the shaft, such that the deflectable means is deflected relative to the inner periphery of the core means to vary the average dimension of said air gap in relation to the deformation of said shaft, and the voltage induced in the secondary winding when the primary winding is excited with alternating current provides an indication of the torque which produced the deformation.

2. The sensor set forth in claim 1, where the pair of support means are secured to longitudinally displaced points on the shaft, and the shaft includes a torsion bar connected between such points to augment the relative rotation experienced by said support means due to torque induced deformation of the shaft.

3. A sensor responsive to the deformation of a rotary shaft to provide an indication of the torque which produced the deformation, the sensor comprising:
annular magnetic core means disposed about said shaft and supported stationary with respect thereto, primary and secondary windings disposed within a recess in the inner periphery of said core means, and magnetic deflectable means disposed within said core means to define an air gap between said deflectable means and said core means, the deflectable means being supported at longitudinally displaced points thereof by a pair of support means which experience relative rotation in relation to the deformation of the shaft, such that the deflectable means is deflected relative to the inner periphery of the stator means to vary the average dimension of said air gap in relation to the deformation of said shaft; and
circuit means for exciting the primary winding with alternating current, and for demodulating the voltage induced in the secondary winding to define an output signal which varies in relation to the torque which produced the deformation.

4. A sensor responsive to the deformation of a rotary shaft to provide an indication of the torque which produced the deformation, the sensor comprising:
first and second annular magnetic core means disposed about said shaft and supported stationary with respect thereto, each such core means having primary and secondary windings disposed within a recess in the inner periphery thereof, and a magnetic deflectable element disposed within each of said first and second core means to define, in each case, an air gap between the respective core means and deflectable element, each such deflectable element being supported at longitudinally displaced points thereof by a pair of support means which experience relative rotation in relation to the deformation of the shaft, the deflectable elements being oppositely deflected relative to the inner periphery of the respective core means to respectively increase and decrease the average dimension of said air gaps in relation to the deformation of said shaft, whereby the net voltage induced in the secondary windings when the primary windings are excited with alternating current provides an indication of the torque which produced the deformation.

5. The sensor set forth in claim 4, where the pair of support means are secured to longitudinally displaced points on the shaft, and the shaft includes a torsion bar connected between such points to augment the relative rotation experienced by said support means due to torque induced deformation of the shaft.

* * * * *